United States Patent [19]

Hekal et al.

[11] 3,968,311

[45] July 6, 1976

[54] METAL COATED WITH COMPOSITIONS PREPARED FROM AQUEOUS DISPERSIONS OF CARBOXYLIC ACID RESIN AND AN ALIPHATIC AMINE

[75] Inventors: Ihab M. Hekal, Downers Grove; Raymond G. Chelton, Chicago, both of Ill.

[73] Assignee: Continental Can Company, Inc., New York, N.Y.

[22] Filed: Sept. 8, 1975

[21] Appl. No.: 611,365

Related U.S. Application Data

[62] Division of Ser. No. 395,820, Sept. 10, 1973, Pat. No. 3,904,569.

[52] U.S. Cl. ............................... 428/461; 428/500; 427/230; 427/236; 427/239; 426/131
[51] Int. Cl.² ......................................... B32B 15/08
[58] Field of Search ............... 428/461; 260/29.6 N, 260/29.6 M; 427/230, 236, 239

[56] References Cited

UNITED STATES PATENTS

| | | | |
|---|---|---|---|
| 3,053,693 | 9/1962 | Schuster et al. | 428/341 |
| 3,264,272 | 7/1966 | Rees | 428/461 |
| 3,904,569 | 9/1975 | Hekal et al. | 260/29.6 N |

*Primary Examiner*—Harold Ansher
*Assistant Examiner*—Patricia C. Ives
*Attorney, Agent, or Firm*—Paul Shapiro; John J. Kowalik; William A. Dittman

[57] ABSTRACT

Metal surfaces are coated with an aqueous dispersion containing a water dispersible carboxylic acid containing resin and aliphatic polyamine.

2 Claims, No Drawings

METAL COATED WITH COMPOSITIONS PREPARED FROM AQUEOUS DISPERSIONS OF CARBOXYLIC ACID RESIN AND AN ALIPHATIC AMINE

BACKGROUND OF THE INVENTION

1. Field of the Invention

This is a division of Ser. No. 395,820, filed Sept. 10, 1973 now U.S. Pat. No. 3,904,569.

This application also is a continuation-in-part of our copending Ser. No. 301,022, filed Oct. 26, 1972, and now abandoned.

This invention is related to the coating of metal articles, and more particularly to coating metal articles with aqueous dispersions of carboxylic acid containing resins.

2. The Prior Art

In the manufacture of metal containers, a protective synthetic resin coating is applied to the interior of the container. The synthetic resins which are employed for coating the interior of the metal container are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. The removal of the organic solvent creates an air pollution problem which many present-day communities will not tolerate.

Among the various methods which have been proposed to avoid the use of organic solvents in preparing synthetic resin coatings for metal surfaces is to formulate the coating as an aqueous dispersion.

Aqueous dispersions of polymers having reactive carboxylic acid groups and heat curable, thermosetting resins have been proposed by the art as metal coatings, e.g. U.S. Pat. Nos. 2,902,390, 2,954,358, 3,053,693, 3,094,435, 3,107,227, 3,378,477, 3,403,088, 3,466,347 and British Pat. No. 1,271,572. These coating materials have not found wide commercial application in the beverage container industry as many of these coatings are not sufficiently inert to the packaged product. For example, malt beverages such as beer and ale are especially sensitive to container coatings and many coating materials are rejected because contact with malt beverages, even for short periods of time, causes the beverage to lose clarity and deteriorate into a cloudy product which is unacceptable to the consumer.

SUMMARY OF THE INVENTION

In accordance with the present invention, there is provided, dispersed in an aqueous medium, a coating composition for application to metal surfaces to provide a coating film inert to malt beverages which coating composition is comprised of a mixture of carboxylic acid containing resin and an aliphatic polyamine.

As will hereinafter be illustrated, the aqueous coating compositions of the present invention when applied to metal surfaces such as aluminum provide a coating film of sufficient product inertness that the coating compositions can be applied to the interior of containers used for the packaging of malt beverages.

PREFERRED EMBODIMENTS

The term "carboxylic acid containing resin" as used herein includes within its meaning copolymers of $\alpha$-olefins with an ethylenically unsaturated carboxylic acid. The $\alpha$-olefins employed in preparing the carboxylic acid containing resin are $\alpha$-olefins which have the general formula $RCH=CH_2$ wherein R is either a hydrogen or an alkyl group having from 1 to 8 carbon atoms. Typical examples of suitable olefins include ethylene, propylene, butene-1, and 3-methylbutene-1.

The ethylenically unsaturated carboxylic acid component of the carboxylic acid resin is an $\alpha\beta$-ethylenically unsaturated carboxylic acid having from 3 to 8 carbon atoms. Examples of such acids are acrylic acid, methacrylic acid, ethacrylic acid, itaconic acid, maleic acid, fumarate, ethyl hydrogen fumarate, and maleic anhydride. In the preparation of the compositions of the present invention carboxylic acid containing resins prepared from acrylic acid and methacrylic acid are preferred.

The concentration of the $\alpha$-olefin in the acidic copolymer is in the range of about 60 to about 90 weight percent and the concentration of acidic monomer is from about 10 weight percent to about 40 weight percent, and preferably, from 15 to 30 weight percent.

The carboxylic acid containing resin need not necessarily be a two component polymer. Thus, although the olefin content of the acid copolymer should be about 60 to about 90 weight percent, more than one olefin can be employed to provide the hydrocarbon nature of the copolymer base. Additionally, any third copolymerizable monomer can be employed in combination with the olefin and the ethylenically unsaturated acid comonomer. The scope of copolymers suitable for use in the present invention is illustrated by the following examples: ethylene/acrylic acid copolymers, ethylene/methacrylic acid copolymers, ethylene/itaconic acid copolymers, ethylene/maleic acid copolymers, ethylene/acrylic acid/methyl methacrylate copolymers, ethylene methacrylic acid/ethyl acrylate copolymers, ethylene/propylene/acrylic acid copolymers, ethylene/vinyl chloride/acrylic acid copolymers, polyethylene/acrylic acid graft copolymers, polyethylene/methacrylic acid graft copolymers, polypropyleneacrylic acid graft copolymers and polypropylene/methacrylic acid graft copolymers.

To effect dispersion of the carboxylic acid containing resin in aqueous medium, the resin is neutralized with alkaline reagents such as organic amines.

The term "carboxylic acid resin" also includes within its meaning copolymers of $\alpha$-olefin with an ethylenically unsaturated carboxylic acid in which about 5 to about 75 percent by weight of the carboxylic acid groups have been neutralized by metal ions. These resins are referred to in the art as "ionomer resins".

The metal ions used to obtain partial neutralization of the olefin/carboxylic acid copolymer will generally have a valence of 1 to 3 inclusive and fall in Groups I (A and B) and II (A and B) and the transition elements of the Periodic Table. Illustrative of ionomer resins which may be employed in the practice of the present invention are the alkali metal salts of ethylene/acrylic acid and ethylene/methacrylic acid copolymers containing the cations Na+, K+, Li+, the alkaline earth salts of ethylene/acrylic acid and ethylene/methacrylic acid copolymers containing the cations Ca++, Ba++, Mg++, Sr++ and the zinc salts of these copolymers. Of these, the alkali metal salts are preferred in the practice of the present invention.

The preparation of ionomer resins is disclosed in U.S. Pat. No. 3,264,272 to Rees, the disclosure of which is incorporated herein by reference.

The partially neutralized olefin/carboxylic acid copolymer salts or ionomer resins used in the practice of the present invention have sufficient molecular weight to have a melt index of 100 or less and preferably the melt index of the ionomer resin ranges from 5 to 50 as determined by the procedures set forth in ASTM D-1238.

In preparing the aqueous coating compositions of the present invention the free acid content of the ionomer resin generally ranges from about 5 to about 20 percent by weight. Such ionomer resins are commercially available from the E. I. Dupont De Nemours Company, Inc., Electrochemicals Department, Wilmington, Delaware under the trademark ELVAX D-1265. ELVAX 1265 is an ethylene/methacrylic acid copolymer partially neutralized with sodium ion having a free acid content greater than 13 percent by weight and generally about 14 to 18 percent by weight and a melt index of 10 to 30.

The aliphatic polyamines used in combination with the carboxylic acid containing resins to prepare the coating compositions of the present invention include aliphatic polyamines such as hexamethylene tetramine and polyamines having the general formula $NH_2(C_2H_4NH)_xC_2H_4NH_2$ wherein $x$ is an integer from 0 to 20, and preferably 0 to 10. Exemplary of these polyamines are ethylene diamine, diethylene triamine, triethylene tetramine, tetraethylene pentamine, pentaethylene hexamine, hexaethylene heptamine, heptaethylene octamine, octaethylene nonamine and nonaethylene decamine.

The aqueous dispersions used in the practice of the present invention are prepared by dispersing the carboxylic acid containing resin and polyamine in the aqueous liquid system wherein the amount of the polyamine incorporated in the dispersion is dependent on the acid content of the resin and is generally that amount which is sufficient to completely react with the free acid of the carboxylic acid containing resin. For resins having a free acid content of from 5 to 20 percent by weight, the coating compositions of the present invention are comprised of 75 to 90% by weight of the carboxylic acid containing resin and about 10 to 25% by weight and preferably about 10 to about 20% by weight of the polyamine. Concentrations of polyamine in excess of 25% by weight are to be avoided as the application to metal surfaces of coating compositions containing polyamines in concentrations in excess of 25% by weight results in a rough, discontinuous and therefore unacceptable coating film. Concentrations of polyamine of less than 10% by weight in the coating compositions results in a soft coating film that has very poor abrasion resistance which will scratch easily during container handling in the manufacturing process.

The aqueous coating dispersions of the present invention may also contain fillers, dyes, pigments, surfactants, anti-foam agents, plasticizers, stabilizers, antioxidants in accordance with conventional practice in preparing coating compositions.

The coating compositions of the present invention can be satisfactorily applied to metal surfaces by any of the conventional methods employed by the coating industry. However for coating the walls of metal containers, rinse coating is a preferred method. For general coating purposes, roll, spray and flow coating are also useful methods of application. After applying the coating, the applied coating is cured by heating the coated metal substrate at a temperature of about 350°F to about 450°F for a period of about 1 to 10 minutes.

The preferred coating weight for coating the interior walls of metal containers with an adequately protective organic coating suitable for carbonated beverages is in the range of 0.1 to 5 milligrams of carboxylic acid containing resin coating per square inch of exposed metal surface.

The present invention is illustrated, but not limited, by the following examples.

EXAMPLE I

A series of aqueous coating compositions were prepared having a 5% solids content composed of 85 parts of ELVAX D1265, an ionomer resin, and 15 parts of a variety of aliphatic polyamines. The aqueous coating dispersions were coated on aluminum foil, and then baked for 4 minutes at an oven temperature of about 375°F.

The inertness of the coatings to malt beverages was evaluated by a turbidity test whereby the coated aluminum foil was inserted into a bottle of beer, the bottle sealed and then allowed to stand for 1 day at 130°F followed by 1 day at 140°F whereupon the beer was examined for signs of turbidity.

The results of the turbidity tests of aluminum foil coated with the ionomer resin — aliphatic polyamine aqueous coating compositions is recorded in the Table below.

For purposes of contrast, as a control test, aluminum foil which had been coated in a manner similar to that of Example I but to which a nitrogen containing crosslinking agent outside the scope of the invention was substituted for the aliphatic polyamine components used in Example I were also subjected to the turbidity test. The results of these control tests (designated by the symbol C) are also listed in the Table.

TABLE

| Test No. | Polyamine | Turbidity |
|---|---|---|
| 1 | Ethylene diamine | very slight |
| 2 | Diethylene triamine | very slight |
| 3 | Triethylene tetramine | none |
| 4 | Tetraethylene pentamine | very slight |
| 5 | Hexamethylene tetramine | none |
| $C_1$ | Uron resin* | turbid |
| $C_2$ | Urea/formaldehyde resin** | turbid |
| $C_3$ | Melamine/formaldehyde resin*** | turbid |

*20% RHONITE R-2, N, N' — bis (methoxymethyl) uron
**20% UF 492, product of Rohm and Haas
***20% MM83, product of Rohm and Haas By reference to the Table, it is immediately apparent that aluminum coated with ionomer resin dispersions having aliphatic polyamines incorporated therein in accordance with the present invention exhibit superior inertness to beer when compared to aluminum coated with an ionomer dispersion in which a nitrogen containing compound other than an aliphatic polyamine is employed in the coating dispersion.

EXAMPLE II

An aqueous coating composition was prepared having a 5% solids content composed of 85 parts of an ethylene/methacrylic acid copolymer containing about 13 to 18% by weight acid the copolymer being neutralized with an amine to an alkaline pH to effect dispersion thereof in the aqueous medium. To the dispersion was added 15 parts of diethylene triamine. The aqueous coating dispersion was coated on aluminum foil, and then baked for 4 minutes at an oven temperature of about 385¼F.

The inertness of the coating to malt beverages was evaluated by the turbidity test of Example I. No turbidity was observed with aluminum foil coated with the ethylene/methacrylic acid-diethylene triamine coating composition.

What is claimed is:

1. A metal article coated with a coating composition comprised of a mixture of about 75 to 90% by weight of (1) a carboxylic acid containing olefin copolymer having reactive carboxyl groups prepared from about 60 to about 90 percent by weight of an $\alpha$-olefin having the general formula $RCH=CH_2$ wherein R is selected from the group having 1 to 8 carbon atoms and about 10 to about 40 percent by weight of an $\alpha, \beta$-ethylenically unsaturated carboxylic acid having 3 to 8 carbon atoms, and about 10 to 25 percent by weight of (2) an aliphatic polyamine selected from the group consisting of hexamethylene tetramine and amines of the general formula $NH_2(C_2H_4NH)_xC_2H_4NH_2$, $x$ being an integer from 0 to 20.

2. The metal article of claim 1 wherein the article is an aluminum container having the coating mixture applied to the internal surface thereof.

* * * * *